United States Patent [19]

Siddall et al.

[11] Patent Number: 5,484,862

[45] Date of Patent: Jan. 16, 1996

[54] LIQUID PHASE POWDER BED SYNDIOTACTIC VINYLAROMATIC POLYMERIZATION

[75] Inventors: Jonathan H. Siddall; Daniel A. Beaudoin, both of Midland, Mich.

[73] Assignee: The Dow Chemical Company, Midland, Mich.

[21] Appl. No.: 402,297

[22] Filed: Mar. 10, 1995

[51] Int. Cl.$^6$ ................. C08F 2/02; C08F 12/08
[52] U.S. Cl. ............... 526/88; 526/64; 526/151; 526/160; 526/346; 526/902
[58] Field of Search ................ 526/88, 64, 160, 526/346, 902

[56] References Cited

U.S. PATENT DOCUMENTS

| | | |
|---|---|---|
| 3,838,139 | 9/1974 | Latinen ........................... 526/88 |
| 3,840,509 | 10/1974 | Kajimoto et al. ................ 526/88 |
| 5,037,907 | 8/1991 | Imbayashi et al. . |
| 5,254,647 | 10/1993 | Yamamoto et al. . |
| 5,306,790 | 4/1994 | Imbayashi et al. ............. 526/88 X |
| 5,380,494 | 1/1995 | Ogawa et al. . |

FOREIGN PATENT DOCUMENTS 0593083  4/1994  European Pat. Off. .

*Primary Examiner*—Fred Teskin

[57] ABSTRACT

A liquid phase, powder bed polymerization process for preparing syndiotactic polymers of vinylaromatic monomers comprising:

A) continuously introducing one or more vinylaromatic monomers and one or more catalyst systems to a horizontally disposed, continuously agitated, cylindrically shaped reactor containing a particulated solid, the contents of which are maintained in an agitated state at a Froude Number in the range from 0.1 to 10, and B) continuously removing polymerized product therefrom.

5 Claims, 1 Drawing Sheet

LIQUID PHASE POWDER BED SYNDIOTACTIC VINYLAROMATIC POLYMERIZATION

BACKGROUND OF THE INVENTION

The present invention relates to a continuous process for producing vinylaromatic polymers having a high degree of syndiotacticity. More particularly, the present invention relates to such a process that is capable of forming such polymers having a uniform small particle size in an efficient manner using a powder bed reactor.

It is previously known in the art to prepare vinylaromatic polymers having a high degree of syndiotacticity by the use of a liquid phase, powder bed reactor. This technique was disclosed in U.S. Pat. No. 5,037,907 wherein a vertical tank reactor equipped with a stirring agitator and filled with a particulated polydispersed material, especially particulated syndiotactic polystyrene, was employed. Vinyl aromatic monomer contained in a liquid reaction medium was dispersed through the system in the form of a coating on the particulates and caused to polymerize by use of a Ziegler-Natta catalyst, especially certain Group 4 metal complexes. The extremely large surface area of the particulated solid provides a large capacity for monomer to reside in the liquid phase, and the reaction is conducted at relatively modest temperatures from about 25° C. to 85° C. The process is referred to as a liquid phase polymerization since the monomer remains in the liquid phase during the polymerization. In theory, operation according to this prior art technique avoids the formation of large agglomerates of polymer because the liquid reaction medium remains dispersed on the surface of the particulated material. However, in practice the foregoing reactor design is still plagued by large particle or clump formation leading to poor product qualities, especially at low monomer conversions (less than 75 percent). In addition, the reactor design also achieves insufficient dispersive mixing, further contributing to poor product uniformity due to localized concentration of catalyst, monomer and/or diluent. These defects in the reactor design result in product molecular weight fluctuation and poor control of final product properties.

In U.S. Pat. No. 5,254,647 a process for preparing syndiotactic vinylaromatic polymers in a wiped surface reactor is disclosed. Such reactors allow improved operation by completely avoiding aggregate formation and by more thorough mixing. Desirably, the wiped surface reactor was employed to control polymerization until a powdered product was obtained, on the order of 10 to 20 percent polymerization. Continued polymerization was then conducted in a powder bed reactor such as the previously discussed vertical tank design. Although this scheme overcomes the problem of rapid polymerization in the early stages of the reaction under conditions of poor dispersive mixing, as occurs in the powder bed reactor, the use of two reactors introduces an increased capital expense. In addition, the first stage wiped surface reactor significantly limits the capacity of the system and thus the rate of polymer production. From a capital and process throughput point of view, it would be desirable to be able to conduct the polymerization entirely in a liquid phase, powder bed polymerizer.

For the teachings contained therein, the foregoing United States patents are herein incorporated by reference.

SUMMARY OF THE INVENTION

According to the present invention, there is provided an improved liquid phase, powder bed polymerization process for preparing syndiotactic polymers of vinylaromatic monomers comprising:

A) continuously introducing one or more vinylaromatic monomers and one or more catalyst systems to a horizontally disposed, continuously agitated, cylindrically shaped reactor containing a particulated solid, the contents of which are maintained in an agitated state at a Froude Number in the range from 0.1 to 10, and B) continuously removing polymerized product therefrom.

DETAILED DESCRIPTION OF THE INVENTION

Froude Number, as used herein, is a measure of the degree of agitation of a confined particulated medium. The units are defined in McCabe and Smith, *Unit Operations of Chemical Engineering*, Third Ed., pp. 236–237, equations 9–17, McGraw Hill (1976). By operation of the above identified horizontally disposed reactor within the specified range of Froude Number, a finely particulated polymeric product with good product homogeneity results. At lower Froude Numbers, insufficient mixing of the reactor contents occurs. The resulting product contains large clumps of polymer and has a wide variation in product properties. At Froude Numbers higher than the range specified herein, excess energy is consumed and the process becomes uneconomical.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering Groups.

The skilled artisan will understand that the term "horizontal" as used herein includes slight departures from true horizontal such that the objects of the invention are not adversely affected. In particular, inclinations of the reactor within ±10° from horizontal, or even ±15° from horizontal are not seriously disadvantageous to operation hereunder.

The term "polymer" as used herein refers to a polymeric compound prepared by polymerizing monomers alone or in combination. The generic term polymer thus embraces the term "homopolymer", employed to refer to polymers prepared from only one monomer, and the term interpolymer which refers to polymers prepared by the polymerization of at least two different monomers.

Suitable vinylaromatic polymers prepared according to the present invention include homopolymers or interpolymers of a vinylaromatic monomer represented by the formula: $ArCH=CH_2$, wherein Ar is phenyl or a phenyl group substituted with from 1 to 5 radicals selected from the group consisting of halo, alkyl, and haloalkyl. Exemplary vinylaromatic monomers include styrene, vinyl toluene, t-butyl styrene, chlorostyrene and bromostyrene (with respect to substituted styrene monomers, all isomers individually or in admixture are included). Preferred syndiotactic vinylaromatic polymers include syndiotactic polystyrene and syndiotactic copolymers of styrene and p-vinyltoluene containing up to 25 percent vinyltoluene by weight.

Preferred syndiotactic polymers are such polymers having a degree of syndiotacticity as measured by a racemic triad of the $^{13}C$ NMR spectrum of at least 75 percent and most preferably at least 90 percent.

The resulting syndiotactic vinylaromatic polymer preferably has a weight-average molecular weight of 10,000 to 2,000,000, more preferably from 20,000 to 1,000,000 with a number-average molecular weight of 5,000 to 1,000,000, more preferably 5,000 to 1,500,000. The syndiotactic vinylaromatic polymer preferably has a crystalline melting point from 150° to 270° C.

Suitable catalysts employed in the present polymerization process include any substance previously known to be active in the polymerization of vinylaromatic monomers to form polymers of high syndiotacticity. Generally such catalyst systems comprise a Group 4 metal complex and one or more activating cocatalysts. More particularly such catalyst systems comprise the following components:

A)

1) at least one metal complex corresponding to the formula: $L_mMX_pX'_q$ wherein:

M is titanium, zirconium or hafnium in the +2, +or +4 formal oxidation state;

L is a group containing an anionic, cyclic, delocalized aromatic n-system through which the group is bound to M or a cyclic or noncyclic, non-aromatic, anionic, dienyl or allyl ligand group, bound to M through delocalization of said dienyl or allyl functionality, optionally said dienyl or allyl ligand group may be substituted with one or more groups independently selected from hydrocarbyl, silyl, hydrocarbyloxy, siloxy, germyl, halo, cyano, halohydrocarbyl and combinations thereof, said L group containing up to 60 nonhydrogen atoms;

X independently each occurrence is a monovalent anionic moiety having up to 20 nonhydrogen atoms, provided however that in no occurrence is X an aromatic or nonaromatic anionic group that is n-bonded to M; alternatively, two X groups together may form a divalent, dianionic moiety having both valences bound to M, or alternatively, one or more X groups may be bonded to one or more X' groups thereby forming a moiety that is both covalently bonded to M and coordinated thereto by means of Lewis base functionality;

X' independently each occurrence is a neutral ligating compound having up to 20 nonhydrogen atoms;

m is 0, 1 or 2;

p is an integer from 0 to 4; and the sum of m and p is equal to the formal oxidation state of M;

q is 0, 1 or 2; and 2) an activating cocatalyst, the molar ratio of 1) to 2) being from 1:10,000 to 100:1; or B) the reaction product formed by converting 1) to an active catalyst by use of an activating technique.

The metal complexes used in the present invention may be formed by reacting a metal precursor compound lacking the present L group and containing one or two leaving groups, with group 1 or 2 metalated derivative of such L group or groups. Suitable leaving groups include halide, hydrocarbyloxy, siloxy, sulfonate and carboxylate leaving groups. The procedure is analogous to those disclosed in *J. Am. Chem. Soc.* 107, 5016 (1985) or *Angew. Chem., Intr. Ed. Engl.*, 27, 1099 (1988) and *J. Am. Chem. Soc.*, 104, 3737 (1982). Optionally, if the metal, M, is initially in a higher formal oxidation state than desired in the resulting complex, the above reaction may be conducted in the presence of a reducing agent. One or more neutral ligating compounds such as phosphines, phosphites, amines, carbon monoxide, or ethers may be present during the reaction or may be added later. The reaction is conducted in a suitable noninterfering solvent at a temperature from −100° C. to 300° C., preferably from −78° to 100° C., most preferably from 0° to 80° C. By the term "reducing agent" herein is meant a metal or compound which, under reducing conditions causes the metal center of the resulting complex to be reduced to a lower oxidation state. Examples of suitable metal reducing agents are alkali metals, alkaline earth metals, aluminum and zinc, alloys of alkali metals or alkaline earth metals such as sodium/mercury amalgam and sodium/potassium alloy. Examples of suitable reducing agent compounds are sodium naphthalenide, potassium graphite, lithium alkyls, lithium or potassium alkadienyls; and Grignard reagents. Most preferred reducing agents are the alkali metals or alkaline earth metals, especially lithium and magnesium metal.

Suitable reaction media for the formation of the complexes are aliphatic and aromatic hydrocarbons and halohydrocarbons, ethers, and cyclic ethers. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, xylene, styrene and the like, $C_{1-4}$ dialkyl ethers, $C_{1-4}$ dialkyl ether derivatives of (poly)alkylene glycols, and tetrahydrofuran. Mixtures of the foregoing are also suitable.

The recovery procedure involves separation of the resulting alkali metal or alkaline earth metal salt and devolatilization of the reaction medium. Extraction into a secondary solvent may be employed if desired. Alternatively, if the desired product is an insoluble precipitate, filtration or other separation technique may be employed.

Preferred metal complexes are those wherein M is titanium or zirconium, most preferably titanium. The group, L, preferably does not decompose under reaction conditions used to prepare the complexes used in this invention. Also, under subsequent polymerization conditions, or in the formation of catalytic derivatives of the present complexes, L, may undergo chemical reactions or may be replaced by another ligand.

By the term "aromatic" when used with reference to L groups, is meant that the atoms contributing electrons to the n-system through which this anionic ligand is n-bonded to the metal form a cyclic, planar, n-system with 4n+2 electrons, where n is an integer greater than or equal to 0. Examples of suitable L groups include cyclopentadienyl, pyrroyl, cyclooctatetraenyl, and substituted derivatives thereof. Suitable substituents include hydrocarbyl, halocarbyl, halohydrocarbyl, silyl, germyl, halo, amino, phosphino, hydrocarbyloxy, siloxy and combinations thereof, said substituent having up to 20 nonhydrogen atoms, or optionally, two such substituents are joined together causing L to have a fused ring structure. Examples of the latter fused ring structures include indenyl, fluorenyl, and hydrogenated derivatives thereof. Desirably, such L groups contain up to 50 non-hydrogen atoms.

Preferred L groups correspond to the formula:

wherein:

R″ in each occurrence is independently selected from the group consisting of hydrogen, hydrocarbyl, silyl, germyl, and combinations thereof said R″ having up to 20 non-hydrogen atoms, or adjacent R″ groups together form a hydrocarbylene group of up to 10 carbons which is connected to adjacent positions of the cyclopentadienyl ring. Most preferred L groups are selected from the group consisting of cyclopentadienyl, methylcyclopentadienyl, tetramethylcyclopentadienyl, pentamethylcyclopentadienyl, t-butylcyclopentadienyl, trimethylsilylcyclopentadienyl, indenyl, tetrahydroindenyl, fluorenyl, tetrahydrofluorenyl and octahydrofluorenyl.

By the term "non-aromatic" when used with reference to L groups is meant that the atoms contributing electrons to the n-system through which the anionic ligand is n-bonded to the metal do not form a cyclic, planar, n-system with 4n+2 electrons, where n is an integer greater than or equal to 0. Examples of suitable non-aromatic L groups include pentadienyl, cyclohexadienyl, silacyclohexadienyl, cycloheptadienyl, or cyclooctadienyl groups, or substituted derivatives thereof, as well as the methyldiphenyl group:

and partially hydrogenated or inertly substituted derivatives thereof.

Examples of non-aromatic L groups are groups corresponding to the following formulas:

wherein:

R′ in each occurrence is a ligand that is independently selected from the group consisting of hydrogen, hydrocarbyl, silyl, germyl, siloxy, amino, hydrocarbyloxy, cyano, halo and combinations thereof, said R′ having up to 20 non-hydrogen atoms, and optionally, two or more R′ groups may together form a divalent derivative of one of the foregoing ligands.

Especially suitable L groups are selected from the group consisting of pentadienyl, cyclohexadienyl, silacyclohexadienyl, cycloheptadienyl, or cyclooctadienyl groups; hydrocarbyl, silyl, hydrocarbyloxy and siloxy substituted derivatives of such groups; partially hydrogenated anthracenyl, or partially hydrogenated naphthalenyl groups; and hydrocarbyl, silyl, hydrocarbyloxy or siloxy substituted derivatives of such partially hydrogenated anthracenyl or partially hydrogenated naphthalenyl groups.

Each non-aromatic L group is bound to the metal atom by any suitable electronic interaction. In certain circumstances the exact form of electronic interaction may be indeterminate, because any one of several isomeric configurations thereof may be generated, that is, either $\eta^1$-, $\eta^3$-, or $\eta^5$-bonded ligands. This fact has been previously disclosed in the art, particularly in the teachings of R. D. Ernst, *Chem. Rev.*, 88, 1255–1291 (1988), and R. D. Ernst, et al., *J. Am. Chem. Soc.*, 107, 5016–5018 (1985). Moreover it is further well understood that the dienyl ligand in an $\eta^5$-bonded configuration may be depicted in every one of several isomeric configurations, known as the "W", "U" and "S" configurations. Such isomeric forms are illustrated with the 2,4-dimethylpentadienyl ligand in the following drawing:

Such variants are not necessarily separately named herein nor are the carbon atoms contributing to the dienyl ligand's bonds always identified since the labile isomeric nature of such groups is well recognized by the skilled artisan, as illustrated by the above cited Ernst and Ernst, et al. references. It is to be further understood that in naming the foregoing groups, the original positions of the double bonds of the dienyl ligand need not be identified since in the final delocalized ligand group, the original double bonds no longer exist. That is, the $\eta^5$-1,3-pentadienyl group is identical to the $\eta^5$-1,4-pentadienyl group. All such isomers are equivalent and may be referred to simply as $\eta^5$-pentadienyl. For purposes of the present invention it is to be understood that all possible isomeric forms of L with regard to any reference to $\eta^1$, $\eta^3$, $\eta^5$ bonding or "W", "S", or "U" configurations are included in any reference to a specific isomer or electronic structure.

The positional numbering of the non-aromatic L groups herein is accomplished by identifying the carbons contributing to the n-bond or where no ambiguity is possible, merely identifying the total carbons contributing to such bond with the symbol, η. In monocyclic systems the lowest ordinals in sequence are assigned to the carbons contributing to the n-bond with the positions otherwise numbered so as to produce the lowest positional numbers for substituted carbon atoms. Thus, the trimethyl-substituted cyclohexadienyl ligand group derived from 1,5,5-trimethyl-1,3-cyclohexadiene (illustrated as follows)

cyclohexadiene compound ligand is named (2,6,6-trimethyl-η⁵-cyclohexadienyl) rather than (4,6,6-trimethyl-η⁵-cyclohexadienyl) or (1,1,2-trimethyl-η⁵-cyclohexadienyl). Multicyclic systems are numbered using standard nomenclature so as to avoid confusion. Specifically, hydrogenated naphthalenyl and hydrogenated anthracenyl systems are specifically illustrated as follows:

Hydrogenated positions of multicyclic systems are generally identified herein, however it is to be further understood that the various isomeric forms of such hydrogenated ligands, where possible, are not necessarily separately named herein.

Examples of the foregoing non-aromatic L groups include: (η⁵-pentadienyl), (2,4-dimethyl-η⁵-pentadienyl), (1,5-dimethyl-η⁵-pentadienyl), (1,5-bis(trimethylsilyl)-η⁵-pentadienyl), (η⁵-cyclohexadienyl), (6,6-dimethyl-η⁵-cyclohexadienyl), (6,6-dimethyl-η⁵-6-sila-cyclohexadienyl), (6-t-butyl-6-methoxy-η⁵-6-sila-cyclohexadienyl), (6-methyl-6-fluoro-η⁵-6-sila-cyclohexadienyl), (1,2,6,6-tetramethyl-η⁵-cyclohexadienyl), (1,2,4,6,6-pentamethyl-η⁵-cyclohexadienyl), (1,2,5,6,6-pentamethyl-η⁵-cyclohexadienyl), (1,2,4,5,6,6-hexamethyl-η⁵-cyclohexadienyl), (1,2,4,5-tetramethyl-6,6-cyclotrimethylene-η⁵-cyclohexadienyl), (2,3,4,9,10-η⁵-1,2-dihydronaphthalenyl), (2,3,4,9,10-η-1,2-dihydronaphthalenyl), (1,1-dimethyl-2,3,4,9,10-η-1,2-dihydronaphthalenyl), (1,1-dimethyl-2,3,4,9,10-η-1,2-dihydronaphthalenyl), and diphenylmethyl, the equivalent ligands: (1,1-dimethyl-2,3,4,9,10-η-1,2,5,6,7,8-hexahydronaphthalenyl), (1,1-dimethyl-2,3,4,9,10-η-1,4,5,6,7,8-hexahydronaphthalenyl), and (1,1-dimethyl-2,3,4,9,10-η-1,5,6,7,8,9-hexahydronaphthalenyl), the equivalent ligands (1,1,2,3-tetramethyl-2,3,4,9,10-η-1,2,5,6,7,8-hexahydronaphthalenyl), (1,1,2,3-tetramethyl-2,3,4,9,10-η-1,4,5,6,7,8-hexahydronaphthalenyl), and (1,1,2,3-tetramethyl-2,3,4,9,10-η-1,5,6,7,8,9-hexahydronaphthalenyl), (10,11,12,13,14-η-9,10-dihydroanthracenyl), (9,9-dimethyl-10,11,12,13,14-η-9,10-dihydroanthracenyl), (10,11,12,13,14-η-1,2,3,4,9,10-hexahydroanthracenyl), (10,11,12,13,14-η-1,2,3,4,9,11-hexahydroanthracenyl), (10,11,12,13,14-η-1,4,5,8,9,10-hexahydroanthracenyl), (9,9-dimethyl-10,11,12,13,14-η-1,4,5,8,9,10-hexahydroanthracenyl), (9,9-dimethyl-10,11,12,13,14-η-1,4,5,8,9,10-hexahydroanthracenyl), (8,8-dimethyl-5,6,7,13,14-η-1,4,5,8,9,10-hexahydroanthracenyl), the equivalent ligands: (10,11,12,13,14-η-1,2,3,4,5,6,7,8,9,10-decahydroanthracenyl) and (10,11,12,13,14-η-1,2,3,4,5,6,7,8,9,11-decahydroanthracenyl); and the equivalent ligands: (9,9-dimethyl-10,11,12,13,14-η-1,2,3,4,5,6,7,8,9,10-decahydroanthracenyl) and (9,9-dimethyl-10,11,12,13,14-η-1,2,3,4,5,6,7,8,9,11-decahydroanthracenyl).

These groups are further illustrated in the following structures:

(η⁵-pentadienyl), (2,4-dimethyl-η⁵-pentadienyl), (η⁵-cyclohexadienyl), (2,4-dimethyl-η⁵-cyclohexadienyl), (6,6-dimethyl-η⁵-cyclohexadienyl), (1,2,4,5,6,6-hexamethyl-η⁵-cyclohexadienyl), (1,2,4,5-tetramethyl-6,6-cyclotetramethylene-η⁵-cyclohexadienyl), (6,6-dimethyl-η⁵-6-silacyclohexadienyl), (6-t-butyl-6-methoxy-η⁵-6-silacyclohexadienyl), (2,3,4,9,10-η-1,2-dihydronaphthalenyl) or (1,2,3,9,10-η-1,4-dihydronaphthalenyl), (1,1-dimethyl-2,3,4,9,10-η-1,2-dihydronaphthalenyl), (1,1-dimethyl-2,3,4,9,10-η-1,4,5,6,7,8-hexahydronaphthalenyl), (1,1-dimethyl-2,3,4,5,10-η-1,2,6,7,8,9-hexahydronaphthalenyl), (1,1-dimethyl-3,4,5,6,10-η-1,2,3,7,8,9-hexahydronaphthalenyl), (1,1,2,3-tetramethyl-2,3,4,9,10-η-1,4,5,6,7,8,9-hexahydronaphthalenyl), diphenylmethyl, di(1-cyclohexenyl)methyl, diphenyltrimethylsilylmethyl, (10,11,12,13,14-η-9,10-dihydroanthracenyl), (9,9-dimethyl-10,11,12,13,14-η-9,10-dihydroanthracenyl), (9,9-dimethyl-4,10,12,13,14-η-1,2,3,4,9,10-hexahydroanthracenyl) or
(9,9-dimethyl-4,10,12,13,14-η-1,2,3,4,9,11-hexahydroanthracenyl), (9,9-dimethyl-10,11,12,13,14-η-1,2,3,4,9,10-hexahydroanthracenyl) or
(9,9-dimethyl-10,11,12,13,14-η-1,2,3,4,9,11-hexahydroanthracenyl), (9,9-dimethyl-10,11,12,13,14-η-1,4,5,8,9,10-hexahydroanthracenyl) or
(9,9-dimethyl-10,11,12,13,14-η-1,4,5,8,9,11-hexahydroanthracenyl), (1,1-dimethyl-2,3,4,11,12,-η-1,4,5,6,7,8,9,10,13,14-decahydroanthracenyl) or
(1,1-dimethyl-2,3,4,11,12,-η-1,5,6,7,8,9,10,11,13,14-decahydroanthracenyl), (9,9-dimethyl-10,11,12,13,14-η-1,2,3,4,5,6,7,8,9,10-decahydroanthracenyl) or
(9,9-dimethyl-10,11,12,13,14-η-1,2,3,4,5,6,7,8,9,11-decahydroanthracenyl)

Suitable X groups include both σ-bonded and π-bonded anionic ligands, excluding those of the class defined by L. Examples of X groups include: halide (fluoride, chloride, bromide and iodide, especially chloride), hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 nonhydrogen atoms. Preferred X groups are chloride, OR, and NR$_2$, where R independently each occurrence is a hydrocarbyl or silyl group of up to 10 nonhydrogen atoms. Especially suited X groups are methoxy, phenoxy, isopropoxy, and dimethylamido.

Preferred X' groups are phosphines, especially trimethylphosphine, triethylphosphine, triphenylphosphine, trifluorophosphine and bis(1,2-dimethylphosphino)ethane; phosphites, especially trimethyl phosphite, triethyl phosphite, and dimethylphenyl phosphite; ethers, especially tetrahydrofuran; amines, especially pyridine, bipyridine, tetramethylethylenediamine (TMEDA), and triethylamine; and carbon monoxide.

Preferred coordination complexes used according to the present invention are complexes corresponding to the formula:

wherein:

M is titanium or zirconium in the +4 formal oxidation state;

R" is as previously defined;

X is chloride, $C_{1-6}$ hydrocarbyl or $C_{1-6}$ hydrocarbyloxide; and d is 3.

More preferably, R" independently in each occurrence is hydrogen, methyl, ethyl, propyl, butyl, pentyl, hexyl, (including where appropriate all isomers), cyclopentyl, cyclohexyl, norbornyl, benzyl, phenyl, silyl of up to 5 nonhydrogen atoms, or adjacent R" groups are linked together thereby forming an indenyl, tetrahydroindenyl, fluorenyl, tetrahydrofluorenyl, or octahydro-fluorenyl group.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or diisobutylalumoxane; strong Lewis acids, such as, $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277, 003, U.S. Pat. No. 5,153,157, U.S. Pat. No. 5,064,802, EP-A-468,651 (equivalent to U.S. Ser. No. 07/547,718), now abandoned, EP-A-520,732 (equivalent to U.S. Ser. No. 07/876,268), and EP-A-520,732 (equivalent to U.S. Ser. Nos. 07/884,966 filed May 1, 1992, now U.S. Pat. No. 5,350,723), the teachings of which are hereby incorporated by reference.

Suitable nonpolymeric, inert, compatible, noncoordinating, ion forming compounds useful as cocatalysts in one embodiment of the present invention comprise a cation which is a Bronsted acid capable of donating a proton, and an inert, compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)^+_f(A^{f-})$$

wherein:

L* is a neutral Lewis base;

$(L^*-H)^+$ is a Bronsted acid;

$A^{f-}$ is a noncoordinating, compatible anion having a charge of f–, and f is an integer from 1 to 3.

More preferably f is one, that is $A^{f-}$ is $A^-$. Highly preferably, $A^-$ corresponds to the formula:

$$[BQ_4]^-$$

wherein:

B is boron in the +formal oxidation state; and

Q independently each occurrence is selected from hydride, dialkylamido, halide, alkoxide, aryloxide, hydrocarbyl, and halosubstituted-hydrocarbyl radicals, said Q having up to 20 carbons with the proviso that in not more than one occurrence is Q halide.

In a most preferred embodiment, Q is a fluorinated $C_{1-20}$ hydrocarbyl group, most highly preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium) tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl) borate, N,N-diethylanilinium tetrakis (2,3,4,6-tetrafluorophenyl)borate, and N,N-dimethyl-(2,4,6-trimethylanilinium) tetrakis -(2,3,4,6-tetrafluorophenyl)borate; dialkyl ammonium salts such as: di-(i-propyl)ammonium tetrakis(pentafluorophenyl)borate, and dicyclohexylammonium tetrakis(pentafluorophenyl)borate; and tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate.

Preferred are N,N-dimethylanilinium tetrakis(pentafluorophenyl)borate and tributylammonium tetrakis(pentafluorophenyl)borate.

Another suitable nonpolymeric, inert, compatible, noncoordinating, ion forming, activating cocatalyst comprises a salt of a cationic oxidizing agent and a noncoordinating, compatible anion represented by the formula:

$$(Ox^{e+})_f(A^{f-})_e$$

wherein:

$Ox^{e+}$ is a cationic oxidizing agent having a charge of e+;

e is an integer from 1 to 3; and $A^{f-}$, and f are as previously defined.

Examples of cationic oxidizing agents include: ferrocenium, hydrocarbyl-substituted ferrocenium, $Ag^+$, or $Pb^{+2}$. Preferred embodiments of $A^{f-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$\copyright^+A^-$$

wherein:

$\copyright^+$ is a $C_{1-20}$ carbenium ion; and $A^-$ is as previously defined. A preferred carbenium ion is the trityl cation, i.e. triphenylcarbenium.

A further suitable ion forming, activating cocatalyst comprises a compound which is a salt of a silylium ion and a noncoordinating, compatible anion represented by the formula:

$$R^1{}_3Si(X')_h{}^+A^-$$

wherein:

$R^1$ is $C_{1-10}$ hydrocarbyl, h is a number from 0 to 3, and

X' and $A^-$ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. application Ser. No. 08/304,314, filed Sep. 12, 1994, the teachings of which are hereby incorporated by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference. Preferred complexes include phenol, especially fluorinated phenol adducts of tris(pentafluorophenyl)borane. The latter cocatalysts are disclosed and claimed in U.S. patent application Ser. No. 08/304,306, filed Sep. 12, 1994, the teachings of which are hereby incorporated by reference.

The foregoing activating techniques and ion forming cocatalysts are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

An especially preferred activating cocatalyst comprises the combination of a trialkyl aluminum compound having from 1 to 4 carbons in each alkyl group and an ammonium salt of tetrakis(pentafluorophenyl)borate, in a molar ration from 0.1:1 to 1:0.1, optionally containing up to 1000 mole percent of an alkylaluminoxane.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0° to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter electrode respectively). Suitably materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is a noncoordinating, compatible anion.

Examples of cations, $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl group, especially tetra-n-butylammonium tetrakis(pentafluorophenyl) borate.

The molar ratio of catalyst/cocatalyst employed preferably ranges from 1:10,000 to 100:1, more preferably from 1:5000 to 10:1, most preferably from 1:10 to 1:1.

Preferred activating cocatalysts are methylalumoxane (MAO), $C_{1-10}$ trihydrocarbylammonium tetrakis( pentafluorophenyl)borate compounds, perfluorinated triarylborane compounds, or mixtures thereof.

The polymerization is conducted at temperatures from 25°–85° C. and pressures from atmospheric to 10,000 atmospheres. A support for the catalyst, especially silica, alumina, or a polymer (especially polytetrafluoroethylene or a syndiotactic polyvinylaromatic compound) may be employed, if desired. Generally however, the catalyst system is employed in a homogeneous manner. In most polymerization reactions the molar ratio of catalyst:vinylaromatic monomer is from $10^{-12}$:1 to $10^{-1}$:1, more preferably from $10^{-12}$:1 to $10^{-5}$:1.

Suitable diluents for use in the polymerization are inert liquids especially aromatic compounds such as benzene, toluene, ethylbenzene, xylene and the like. Additional diluents that may be used to cool the reaction through the latent heat of vaporization, especially low boiling aliphatic compounds such as butane, pentane, isopentane, and hexane, may also be present if desired. Hydrogen gas is desirably added to assist in control of molecular weight and improve catalyst efficiency. Finally, gaseous, inert diluents may be present in the reaction mixture to assist in preventing oxygen entry to the reactor. Preferably a positive pressure from 0.1 to 100 psi (0.7 to 700 kPa) above ambient is desirable inside the reactor to retain the reaction mixture under inert reaction conditions.

Figure 1:
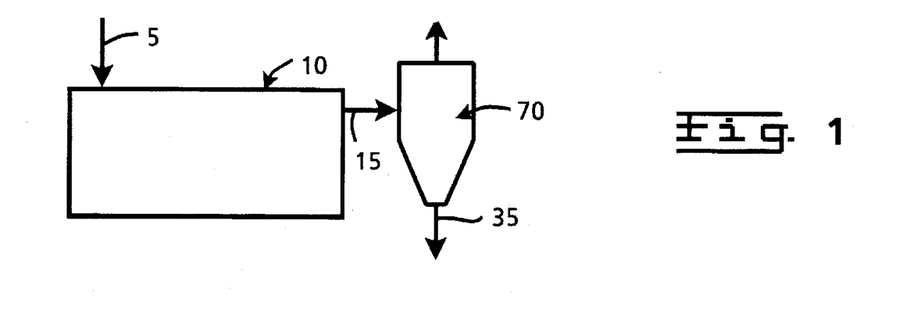
FIG. 1 depicts, in schematic form, the present process flow.

The operation of the reactor design is now explained in more detail. Referring to FIG. 1 in a preferred embodiment of the process, one or more vinylaromatic monomers are introduced to the reactor 10, through line 5. Additional reaction components such as catalysts, catalyst activators, diluents, chain transfer agents and inerting agents may be introduced through line 5 or by separate addition means (not depicted). A product stream is removed via line 15 and separated in a recovery device 70, into a recycle stream 25, and the desired product stream 35.

Figure 2:
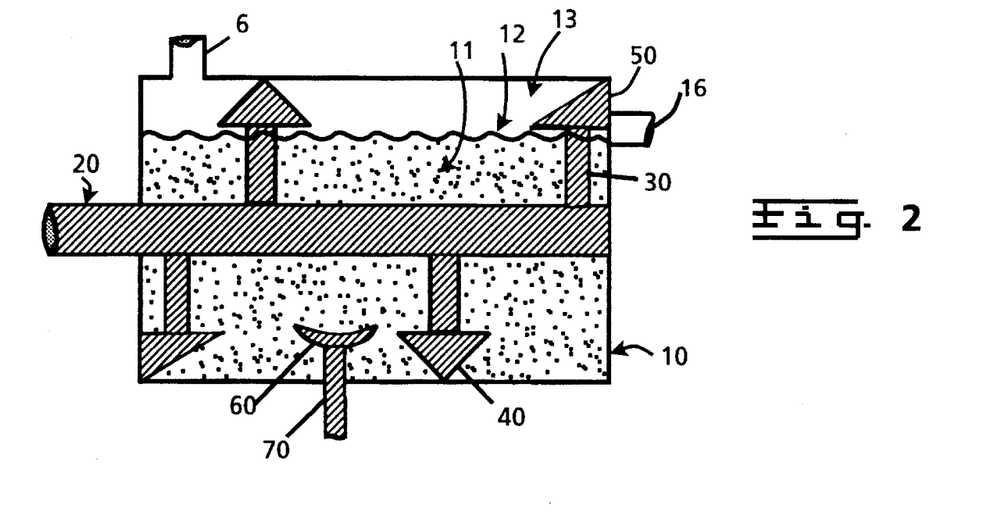
FIG. 2 is a cutaway view of the horizontally disposed reactor.

In FIG. 2, the reactor 10, is depicted in cross section view, partially filled with a particulated solid 11. The surface level 12, of the particulated solid is maintained by continuous removal of product through exit 16, and continuous addition of reactants through entrance 6. Remaining volume 13, of the reactor is filled with vaporized monomer, diluent, chain transfer agent and/or inerting agent. The reactor contents are maintained in an agitated state by means of a suitable agitation device. In a desirable embodiment, such an agitation device comprises a shaft 20, which extends along the center line of the cylindrically shaped reactor. Attached to the shaft are laterally extending arms 30, ideally having plows 40, and half plows 50 attached at their outer extremity in close proximity to the reactor walls. Upon rotation of the shaft by means of a power source (not depicted), the arms and plows together provide agitation to the reactor contents. An optional pulverizing device 60, rotated by shaft 70, may be provided in the region between plows to continuously break up large agglomerations of polymerized product to provide more uniformly sized particles therefrom.

Figure 3:
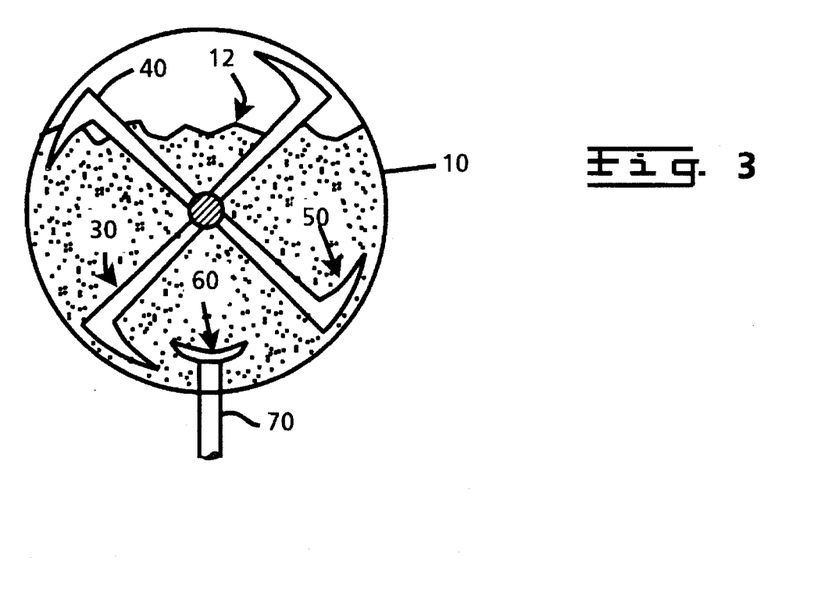
FIG. 3 is an end view of the horizontally disposed reactor.

In FIG. 3, there is provided an end view of the reactor 10, depicting the surface level of the reactor contents 12, and arms 30, plows 40, half plows 50, pulverizing device 60, and rotating shaft 70.

In a typical polymerization process, the horizontally disposed cylindrical reactor remains stationary. The axially disposed agitation means rotates at a speed from 10 to 250 rpm, preferably from 20 to 150 rpm. The optional pulverizing device is desirably a rotating blade operating at a speed from 500 to 5000 rpm, preferably from 600 to 3000 rpm.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

Example 1

A 0.130 $M^3$ cylindrical mixer equipped with an agitator, said agitator comprising an axially disposed shaft supporting 4 evenly spaced, dynamically balanced, radially projecting steel arms terminating in steel plows (Littleford Plow mixer model DVT130), was modified to a continuous reactor by replacement of the end plate with a solid steel plate having a small (50 mm) diameter exit hole located approximately 5 cm from the outer edge of the mixer. The plows terminated with approximately 0.5 cm clearance between the outer walls and the reactor's endplates. The reactor was placed in a substantially horizontal position with respect to the axis thereof. Between the second and third plows, a high speed chopper comprising a rotating knife blade was attached to a shaft inserted approximately 10 cm into the reactor through a hole in the bottom wall. The reactor was filled with approximately 50 kg of syndiotactic polystyrene pellets, heated to 70° C. and inerted with flowing nitrogen (0.02 $M^3$/min) via a line entering the bottom of the reactor. The agitator speed was 75 rpm and the chopper speed was 3500 rpm.

After two hours of heating under these conditions, styrene monomer was introduced to the reactor at a rate of 5 to 20 kg/hr through a 6 mm addition line located vertically approximately half way between the top and bottom of the reactor and longitudinally between the second and third plows. A catalyst solution of pentamethylcyclopentadienyltitanium trismethoxide, methylalumoxane (MAO) and triisobutyl aluminum (TIBA) in toluene was fed to the reactor at a point approximately 5 cm removed from the monomer addition point at a rate to provide a molar ratio of monomer:Ti:MAO:TIBA of 175,000:1:75:50.

Polymer formation caused an increase of powder volume which was maintained at the desired level by expulsion through the exit hole. Steady state operation was reached after approximately 24 hours of operation. Polymerization was continued for 21 days. The product formed had a particle size of 20 to 1000 μM and a tacticity in excess of 95 percent. After discontinuation of the polymerization, the reactor was emptied of powdered product, disassembled, and visually inspected. No substantial polymer accumulation was detected.

What is claimed is:

1. A liquid phase, powder bed polymerization process for preparing syndiotactic polymers of vinylaromatic monomers comprising:

A) continuously introducing one or more vinylaromatic monomers and one or more catalyst systems to a horizontally disposed, continuously agitated, cylindrically shaped reactor containing a particulated solid, the contents of which are maintained in an agitated state at a Froude Number in the range from 0.1 to 10, and B) continuously removing polymerized product therefrom.

2. The process of claim 1 wherein the particulated solid is a syndiotactic vinylaromatic polymer.

3. The process of claim 1 wherein the catalyst system comprises:

A)
1) at least one metal complex corresponding to the formula: $L_mMX_pX'_q$, wherein:

M is titanium, zirconium or hafnium in the +2, +3 or +4 formal oxidation state;

L is a group containing an anionic, cyclic, delocalized aromatic n-system through which the group is bound to M or a cyclic or noncyclic, non-aromatic, anionic, dienyl or allyl ligand group, bound to M through delocalization of said dienyl or allyl functionality, optionally said dienyl or allyl ligand group may be substituted with one or more groups independently selected from hydrocarbyl, silyl, hydrocarbyloxy, siloxy, germyl, halo, cyano, halohydrocarbyl and combinations thereof, said L group containing up to 60 nonhydrogen atoms;

X independently each occurrence is a monovalent anionic moiety having up to 20 nonhydrogen atoms, provided however that in no occurrence is X an aromatic or nonaromatic anionic group that is n-bonded to M; alternatively, two X groups together may form a divalent, dianionic moiety having both valences bound to M, or alternatively, one or more X groups may be bonded to one or more X' groups thereby forming a moiety that is both covalently bonded to M and coordinated thereto by means of Lewis base functionality;

X' independently each occurrence is a neutral ligating compound having up to 20 nonhydrogen atoms;

m is 0, 1 or 2;

p is an integer from 0 to 4; and the sum of m and p is equal to the formal oxidation state of M;

q is 0, 1 or 2; and 2) an activating cocatalyst, the molar ratio of 1) to 2) being from 1:10,000 to 100:1; or B) the reaction product formed by converting 1) to an active catalyst by use of an activating technique.

4. The process of claim 1 additionally comprising an inert diluent.

5. The process of claim 1 wherein inside the reactor there is located a pulverizing device comprising a rotating blade operating at a speed from 500 to 5000 rpm.

* * * * *

UNITED STATES PATENT AND TRADEMARK OFFICE
CERTIFICATE OF CORRECTION

PATENT NO. : 5,484,862
DATED : January 16, 1996
INVENTOR(S) : Jonathan H. Siddall; Daniel A. Beaudoin It is certified that error appears in the above-indentified patent and that said Letters Patent is hereby corrected as shown below:

Claim 3, column 17, line 10, "≠" should correctly read -- +3 --

Signed and Sealed this

Thirtieth Day of June, 1998

Attest:

BRUCE LEHMAN

Attesting Officer

Commissioner of Patents and Trademarks